(12) United States Patent
Stevens et al.

(10) Patent No.: US 6,899,906 B2
(45) Date of Patent: May 31, 2005

(54) RETICULATION-FREE WATER-DISPERSIBLE COATING COMPOSITION FOR FOOD SUBSTRATES

(75) Inventors: John F. Stevens, Idaho Falls, ID (US); D. Michael Carr, Idaho Falls, ID (US); Cheree L. B. Stevens, Idaho Falls, ID (US)

(73) Assignee: Advanced Food Technologies, Inc., Idaho Falls, ID (US)

( * ) Notice: Subject to any disclaimer, the term of this patent is extended or adjusted under 35 U.S.C. 154(b) by 233 days.

(21) Appl. No.: 09/960,191

(22) Filed: Sep. 21, 2001

(65) Prior Publication Data

US 2002/0058099 A1 May 16, 2002

Related U.S. Application Data

(60) Provisional application No. 60/234,153, filed on Sep. 21, 2000.

(51) Int. Cl.$^7$ ....................... A23L 1/0522; A23L 1/216; A23L 1/31
(52) U.S. Cl. ........................... 426/89; 426/92; 426/102; 426/578; 426/618
(58) Field of Search ........................... 426/89, 92, 102, 426/578, 618, 93, 549, 637

(56) References Cited

U.S. PATENT DOCUMENTS

| | | |
|---|---|---|
| 3,424,591 A | 1/1969 | Gold |
| 3,597,227 A | 8/1971 | Murray et al. |
| 3,751,268 A | 8/1973 | Van Patten et al. |
| 4,053,650 A | 10/1977 | Chino et al. |
| 4,504,509 A | 3/1985 | Bell et al. |
| 4,520,034 A | 5/1985 | Ishii et al. |
| 4,551,340 A | 11/1985 | El-Hag et al. |
| 4,710,228 A | 12/1987 | Seaborne et al. |
| 4,790,997 A | 12/1988 | Friedman et al. |
| 4,792,458 A | 12/1988 | Friedman et al. |
| 4,828,847 A | 5/1989 | Thompson |
| 5,004,616 A | 4/1991 | Shanbhag et al. |
| 5,035,912 A | 7/1991 | Furcsik et al. |
| 5,059,435 A | 10/1991 | Sloan et al. |
| 5,120,562 A | 6/1992 | Furcsik et al. |
| 5,141,759 A | 8/1992 | Sloan et al. |
| 5,204,137 A | 4/1993 | Slimak |
| 5,260,076 A | 11/1993 | Furcsik et al. |
| 5,302,410 A | 4/1994 | Calder et al. |
| 5,393,552 A | 2/1995 | Busacker et al. |
| 5,431,944 A | 7/1995 | Melvej |
| 5,484,617 A | 1/1996 | Tiffany |
| 5,492,707 A | 2/1996 | Chalupa et al. |
| 5,622,741 A | 4/1997 | Stubbs et al. |
| 5,626,893 A * | 5/1997 | Reddy ........................ 426/36 |
| 5,648,110 A | 7/1997 | Wu et al. |
| 5,750,168 A | 5/1998 | Woerman et al. |
| 5,753,286 A | 5/1998 | Higgins |
| 5,849,351 A | 12/1998 | Higgins et al. |
| 5,885,639 A | 3/1999 | Judkins et al. |
| 5,897,898 A | 4/1999 | Rogols et al. |
| 5,922,392 A | 7/1999 | Kelly et al. |
| 5,928,693 A | 7/1999 | Friedman et al. |
| 5,965,189 A | 10/1999 | Stevens et al. |
| 5,976,607 A | 11/1999 | Higgins et al. |
| 5,988,048 A | 11/1999 | Hunter et al. |
| 5,997,918 A | 12/1999 | Melvej |
| 6,022,569 A | 2/2000 | Rogols et al. |
| 6,080,434 A | 6/2000 | Horn et al. |
| 6,086,928 A | 7/2000 | Stevens et al. |
| 6,113,957 A | 9/2000 | Mattinson et al. |
| 6,159,521 A * | 12/2000 | Horn et al. .................. 426/549 |
| 6,197,363 B1 | 3/2001 | Walter, Jr. et al. |
| 6,217,921 B1 | 4/2001 | Lanner et al. |
| 6,265,005 B1 | 7/2001 | Haverkos et al. |
| 6,288,179 B1 | 9/2001 | Baur et al. |
| 6,635,294 B2 | 10/2003 | Keijbets |
| 2002/0119219 A1 | 8/2002 | Doyle et al. |
| 2003/0044488 A1 | 3/2003 | Roskam et al. |

FOREIGN PATENT DOCUMENTS

| | | |
|---|---|---|
| WO | WO85011188 | 3/1985 |
| WO | 0086932 | 11/2000 |

OTHER PUBLICATIONS

84$^{th}$ AACC Annual Meeting Symposia and Reports, A. Jurgens, J.M. Maagd, and A.J. ten Dam, Oct. 31–Nov. 3, 1999 (16 pages).
Specialty–Corn Types, David V. Glover, Dept. of Agronomy, Purdue University, Oct. 1999, (1 page).
Capolex B; Specialty Coatings for Snack Foods & Baked Goods, Centerchem, Inc., 1998 (4 pages).
Prior Art Batter Formula (1 page).

* cited by examiner

Primary Examiner—Helen Pratt
(74) Attorney, Agent, or Firm—Price, Heneveld, Cooper, DeWitt & Litton, LLP

(57) ABSTRACT

A water-dispersible coating composition for use on food substrates, which permits incorporation of a substantially increased rice component content compared to prior art coatings, without the occurrence of objectionable white-lump reticulation. The coating contains at least stated minimum levels of small-particle size rice flour and/or rice starch (#100 USS mesh size and/or 200 USS mesh size, respectively or finer) depending upon the total amount of rice used in the mix, and exhibits minimal surface roughness and substantially no reticulation when frozen upon the food substrate, while imparting increased crispness, holding time and lighter color once the frozen coated food substrate is reconstituted via gradient heat, microwave energy, or deep-frying reconstitution methods, without sacrificing appearance, flavor, and tooth compaction characteristics desirable to consumers of the final reconstituted product.

53 Claims, No Drawings

RETICULATION-FREE WATER-DISPERSIBLE COATING COMPOSITION FOR FOOD SUBSTRATES

CROSS-REFERENCE TO RELATED APPLICATION

The present invention claims priority to Provisional Patent Application Ser. No. 60/234,153, filed on Sep. 21, 2000 entitled RETICULATION-FREE WATER-DISPERSIBLE COATING COMPOSITIONS FOR FOOD SUBSTRATES.

FIELD OF THE INVENTION

The present invention relates generally to water-dispersible coating compositions for food substrates, and more particularly to food coating compositions which incorporate any of various flours and/or starches (such as potato and/or corn) as principal ingredients and further include rice flour and/or rice starch as one such ingredient.

BACKGROUND OF THE INVENTION

Methods for preparing and applying various coatings to the outer surfaces of food substrates prior to freezing and cooking, especially cut, raw potato pieces, are well known in the art. Such coatings are often applied to potato strips which are to become french fries in order to obtain one or more of the following objectives: (1) improved visual appearance of the finished (cooked) products, including color; (2) improved eating characteristics, especially crispness of the cooked product; (3) extended holding time during which the cooked product can be held or maintained while retaining preferred characteristics for consumption; (4) improved uniformity of the coating upon the food substrate; (5) improved surface smoothness of the cooked product; and (6) reduction of reticulation crystallization of or in the coating when applied to a food substrate and subsequently frozen.

The food substrate coating industry has for some time attempted to produce coatings for foods such as meat and vegetables, particularly potatoes, in the form of a substantially clear coat. Such "clear coats" are desirable because of their ability or potential of maintaining or enhancing the food substrate's natural appearance to the consumer, while also imparting other desired characteristics to the reconstituted product, particularly increased surface crispness and a moist, mealy, or fluffy interior. Further, such coatings increase the holding time or post-preparation time at which the cooked or reconstituted product can be maintained prior to consumption by a consumer.

To this end, food coatings have been developed previously that were basically clear in appearance when applied to potato strips that were then initially deep-fried (parfried) and frozen for storage prior to finish cooking (i.e., "reconstitution") and consumption. However, developing a substantially clear coat for potato substrates which increases crispness and maintains the increased crispness of the final cooked product over an extended period of time, without impairment or loss of flavor or visual appearance and without the formation of what is known as "reticulation crystallization", has posed a significant difficulty for the industry.

Various dry mix coating compositions which can be dissolved or suspended in an aqueous medium, i.e., are water dispersible, to form a slurry have previously been developed and applied to potato substrates to obtain improved results. Many if not all such prior art potato substrate coatings include at least some rice flour, which has been increasingly regarded as desirable because it enhances crispness without introducing a cereal flavor.

Reticulation crystallization as known in the food coating industry can be described as the formation of small white spots/bumps, which usually occur within about twenty-four to seventy-two hours after freezing of the coated frozen food substrates. This does not go away when the coated food is finish-cooked or reconstituted, and makes the product visually undesirable to consumers. In addition, such reticulation also causes the frozen coated food substrates when reconstituted (via gradient heat, microwave energy, or deep-fat frying) to develop a darker color, rough surface texture, uneven surface coating, decreased crispness, decreased holding time, and poor tooth compaction characteristics, all of which are very important to consumers of the final cooked product. The formation of reticulation occurs when food coatings utilize concentrations of more than about 10% rice flour of the type conventionally used in the industry, i. e., that which is sold commercially as "80 USS mesh size."

Conventional rice flour utilized in food coatings is prepared by milling long, medium, or short-grain varieties of rice to various particle size ranges as determined by screens or meshes having various defined size ratings according to United States Standards (USS). The mesh or screen size rating for the type of rice flour conventionally used in the food coating industry is that which is sold commercially as "80 USS mesh" size, but this actually includes a fairly wide range of differing particle sizes, many of which are larger than #80 USS mesh size screen, and some of which are smaller.

However, food coating formulators have not previously been able to utilize concentrations of rice flour at much more than about 10% without having the coatings develop an undesirable amount of "reticulation crystallization" after being frozen upon a food substrate.

Accordingly, because rice flour is inexpensive and is capable of providing desirable coating characteristics, there is a need within the industry for a food coating which contains more than 10% total rice flour but does not reticulate when applied to and frozen upon food substrates but does impart improved color, surface smoothness, crispness, and holding time characteristics without sacrificing visual appearance, flavor, and tooth compaction characteristics.

With reference to prior patents illustrating prior art coatings as noted above, U.S. Pat. No. 5,141,759 to Sloan et al. discloses a coating composition that contains corn starch along with potato starch and rice flour in order to allegedly achieve a substantially clear and crisp potato coating having a holding time over an extended period.

U.S. Pat. No. 5,976,607 to Higgins et al. discloses the use of a substantial amount of modified cornstarch in a potato substrate coating to allegedly increase crispness of a final coated potato product, along with an amount of rice flour that is said to reduce or balance the crispness characteristic imparted through use of the modified cornstarch.

U.S. Pat. No. 5,997,918 to Melvej discloses a food coating composition for use on potatoes which contains a high percentage of corn starch in relation to rice flour, in order to obtain a coating composition which is said to impart increased crispness and holding time to a coated potato substrate product.

U.S. Pat. No. 5,095,435 to Sloan et al. discloses a process for preparing frozen coated potato products in which an aqueous starch slurry comprised of a combination of modified ungelatinized potato starch, modified ungelatinized cornstarch, rice flour, and other optional ingredients, such as flavorings and seasonings, are utilized to allegedly improve the crispness of the final-cooked coated potato product while maintaining the tenderness of its interior. This patent also states that its disclosed coating, when placed upon a frozen potato strip, can be reconstituted within a conventional oven to produce an acceptable product without decreased flavor characteristics.

Reference is also made to the substantially improved coating disclosed in co-pending application Ser. No. 09/778,470, filed Feb. 7, 2001, by the same inventors, which teaches the use of a high percentage of rice component (flour and/or starch) along with a large dextrin component, that provides generally excellent results.

SUMMARY OF THE INVENTION

In accordance with the present invention, it has now been discovered that a substantially improved but nonetheless inexpensive water-dispersible "clear coat" composition for food substrates may be provided which contains substantially more than 10% rice flour and/or starch, and yet does not reticulate when placed upon food substrates and frozen. At the same time, this new coating imparts improved color, surface smoothness, crispness, and holding time characteristics to the coated food substrate without sacrificing visual appearance, flavor, and tooth compaction characteristics after reconstitution, whether by gradient heat, microwave energy, or deep-fat frying reconstitution methods. In essence, this important advance is accomplished through the use of at least an appreciable amount of smaller (i.e., finer) rice flour particles, preferably of a size at least as small as about 100 mesh (US), in which the particles correspond to about 150 microns or less.

It has also been discovered that the use of rice starch (typically having a particle size of from about 200 mesh or higher, i.e., 75 microns or less) will also exhibit the positive coating and reconstitution effects as those noted above. Further, it has also been discovered that the noted small particle-size rice flour and/or rice starch components may be utilized alone or in combination with other coating ingredients, such as standard mesh-size rice flour, or rice starch, dextrin, maltodextrin, potato starch, corn starch, cellulose ethers, and the like, used on a typical proportional formulation percentage weight basis, without detraction from the benefits obtained pursuant to the present invention.

These and other features, advantages and objects of the present invention will be further understood and appreciated by those skilled in the art after consideration of the following specification, claims and appended drawings.

DETAILED DESCRIPTION OF THE PREFERRED EMBODIMENT

According to one example of the present invention, fresh whole Russet Burbank potatoes are washed in water, peeled, and cut into ¼ inch inch strips about 2½ to 3 inches in length. These strips are then blanched at 180° F. for 15 minutes and subsequently immersed for 40 seconds in a sodium chloride (2%) and Sodium Acid Pyrophosphate (SAPP) 0.5% water solution held at 140°. The potato strips are then removed from the water/salt/SAPP solution and allowed to drip dry before placement into a standard convection oven at 150° F. for 18 minutes to further dry, but not dehydrate, the strips. Such drying reduces the moisture of the potato strips approximately 12%.

Next, a dry-mix coating composition is prepared by using a short, medium, or long grain variety of rice flour, at least some of which has a particle size rating of at least about 100 mesh or greater (or alternatively rice starch, typically having a particle size of about 200 mesh or greater), plus sugar, a leavening agent, (sodium acid pyrophosphate, sodium bicarbonate) and corn syrup solids, and this is dissolved in water at 55° F. to form a slurry. When less than 10% of the dry mix of ingredients is made up of the small particle-size rice flour or rice starch used in accordance with the present invention, the remaining amount required to reach the told amount of rice ingredient which is desired may comprise standard 80 mesh size rice flour or rice starch, and other conventional components such as dextrin, maltodextrin, corn starch, potato starch, cellulose ethers, and the like, and may be used on a percentage weight basis.

The dry-mix coating composition and water is then stirred in a Kitchen-Aid® mixer at a paddle blade speed of two for five minutes and allowed to rest in a non-agitated state for 20 minutes prior to placing the resulting slurry upon the potato strips. The slurry is then placed upon the pre-cut potato strips by immersion of the strips within the slurry for a period of 10 seconds. Following the immersion step, the now coated potato strips are then parfried for 50 seconds in a fryer containing soybean oil heated to a temperature of 365° F. It has been observed during the parfrying step that the coating composition of the present invention does not cause the coated potato strips to stick together, thereby decreasing production time and losses due to unacceptable clumped products, also known as rejects.

The parfried coated potato strips are then removed from the fryer and placed upon wire racks, which are then subsequently put into a chest freezer to bring the temperature of the parfried strips down to about 15° F. or less within 25 minutes or less. This freezes the parfried coated strips, and the frozen coated and parfried potato strips are then placed in plastic bags and held for a period of at least about 24–28 hours in a frozen state at −10° to 10° F. before evaluatory tests are done to assess the quality of the frozen product as to its reticulation characteristics, and then further evaluated subsequently when reconstituted.

Table 1 below sets forth the rice component concentrations (by weight) within an otherwise-conventional food coating composition for various illustrative embodiments in accordance with the invention, together with a prior art food coating, at 72 hour and six-week time periods. It has been observed that, as a general matter, evidence of reticulation does not always manifest itself until after 24 to 48 hours of frozen storage, which in the past has made it difficult or impossible for quality control personnel to find and reject product as it is being produced on production lines. If it is going to be present, however, reticulation almost always manifests itself by the time the product has been stored in a frozen state for 72 hours.

TABLE 1

| | 72 HOUR AND SIX-WEEK RESULTS | | | |
|---|---|---|---|---|
| CONDITION | RETICULATION | APPEARANCE | COLOR | TEXTURE |
| Control #1 - Rice Flour at a concentration of 10% or less by weight using commercial "80 mesh" size rating rice particles. | None | Smooth compared against that of Control #2 | Relatively dark compared with Control #2 | Lacks crispness, but tender and not tough |

TABLE 1-continued

72 HOUR AND SIX-WEEK RESULTS

| CONDITION | RETICULATION | APPEARANCE | COLOR | TEXTURE |
|---|---|---|---|---|
| Control #2 - Rice flour at a concentration of 18% by weight using commercial "80 mesh" size rating rice particles. | Significant | Displays surface roughness. | Lighter in color than Control #1. | Crisp, but somewhat tough. |
| Rice flour at a concentration of 16% by weight having a particle size of 100 mesh or finer. | None | Smooth compared to Control #2. | Somewhat lighter in color than Control #2. | About as crisp as Control #2, but less tough. |
| Rice Flour at a concentration of about 18% by weight having a particle size of 100 mesh or finer. | None | Smooth compared to Control #2. | Lighter in color than both Control #2 and the above. | Crisper but more tough than the above. |
| Rice Flour at 14% concentration having a particle size of 100 mesh or finer in combination with 4% rice starch having a particle size rating of 200 mesh or finer. | None | Smooth compared to Control #2. | Equal to above. | Somewhat crisper but otherwise equal to above. |
| Rice Flour at a concentration of 25% by weight having a particle size of 100 mesh or finer. | Minor | Smooth compared to Control #2. | Lighter in color than the above. | Crisper and less tough than either of the two immediately above. |
| Rice flour at a concentration of 30% by weight having a particle size of 100 mesh or finer. | Minor | Smooth compared to Control #2. | Lighter in color than the above. | Crisper and less tough than the above. |

As clearly shown in Table 1 above, Control #1 does not provide a light-colored product with crispness. Furthermore, Table 1 above shows that even though Control #2 has a relatively high percentage of standard 80 mesh size rice flour which helps to provide a light-colored crisp product, this formulation also produces a rough surface and tough texture, plus a substantial degree of reticulation. Only when using a significant amount of 100-mesh size rice flour (16% in example three) does one obtain a smooth surface appearance, light color, and a crisp product. Using 18% of 100-mesh size rice flour (example four), a product is obtained which has a very smooth surface appearance, a light-color, and exceptionally good crispness. Use of 14% 100-mesh size rice flour and 4% of 200-mesh size rice starch (example five) produces lighter color and a somewhat crisper product yet. Table 1 above also demonstrates that use of even greater amounts (i.e., 25% and 30%) of 100-mesh size rice flour is entirely possible, and these increasing amounts continue to produce increasing lightness in color, increased crispness, and reduced toughness.

Comparative composition tests were also completed, to evaluate various examples of the invention against a currently available prior art coating composition. The compositions, evaluation criteria, and results are reproduced below.

TABLE 2

| FORMULATION | RECONSTITUTION AFTER 72 HOURS AND SIX-WEEK FREEZE |
|---|---|
| Control - Known food coating having 39.7% solids by weight, with rice flour at a concentration of 18.33% using standard "80 mesh size rating" rice flour. | Very noticeable reticulation, some toughness, reasonably good tooth compaction, slight but noticeable surface roughness. |
| Example 1 - Food coating as above with 18.33% rice flour comprising approximately 95% having a mesh size of 100 or finer. | Much less reticulated than Control, somewhat smoother than Control, no noticeable toughness, good tooth compaction. |
| Example 2 - Food coating as above but having 12.22% rice flour comprising approximately 95% having a mesh size of 100 or finer, plus 6.11% "standard" rice flour having a mesh size of 80. | Somewhat more reticulation, surface roughness, etc., than Example 1 above. |
| Example 3 - Food coating as above but having 6.11% rice flour comprising approximately 95% having a mesh size of 100 or finer, plus 12.22% "standard" rice flour having a particle size rating of 80 mesh. | Somewhat more reticulation, surface roughness, etc., than Example 2 above. |

To further illustrate the particle size aspect of the invention, the following Table 3 indicates the results obtained for still other coating formulation embodiments.

TABLE 3

| FORMULATION | RECONSTITUTION AFTER 72 HOURS AND SIX-WEEK FREEZE |
|---|---|
| Control (known coating with 39.7% solids) having approximately 18% | Good overall characteristics but very noticeable reticulation and |

TABLE 3-continued

| FORMULATION | RECONSTITUTION AFTER 72 HOURS AND SIX-WEEK FREEZE |
|---|---|
| "standard" rice flour of 80-mesh size rating. | surface roughness; good organoleptic qualities. |
| Food coating as above but having a total of 14% fine-particle rice flour (100 mesh size or finer) plus 4% rice starch having a particle size rating of 200 mesh. | Better characteristics than Control, less reticulation, improved appearance with slightly lighter color. Very good organoleptic qualities. |
| Food coating as above but having a total of 9% fine-particle rice flour (100 mesh size or finer) plus 9% rice starch having a particle size rating of 200 mesh. | Better characteristics than above, less reticulation, improved appearance with slightly lighter color. Very good organoleptic qualities. |
| Food coating as above but having a total of 18% rice, all comprising rice starch having a particle size rating of 200 mesh. | Better characteristics than above, less reticulation, improved appearance with slightly lighter color. Very good organoleptic qualities. |

The preparation of the samples for the above tests was essentially the same as those set forth above in relation to Table 1, and in all cases reconstitution basically comprises thawing the frozen samples and placing them in an oven at 350° F. for 2.5 minutes. After reconstitution, the various samples were evaluated under a heat lamp (two-250 watt infrared bulbs) positioned approximately 17 inches above the sample.

As one way of attempting to definitively appraise the various formulations set forth in Tables 1, 2, and 3 above, Applicant has made the following rough calculations as to percentage of various particular "fine" particles used in the various formulations indicated. These results are set forth below.

Calculated Fine Particle Content of Table 1, 2, and 3 Formulations

Based on Total Mix Content of Particles Smaller Than 80 US Mesh

TABLE 1

| Control 1 | Percentage of particles smaller than 80 US Mesh | 5.6% |
| Control 2 | Percentage of particles smaller than 80 US Mesh | 10.1% |
| Mixture 3 | Percentage of particles smaller than 80 US Mesh | 9.28% |
| Mixture 4 | Percentage of particles smaller than 80 US Mesh | 10.44% |
| Mixture 5 | Percentage of particles smaller than 80 US Mesh | 12.1% |
| Mixture 6 | Percentage of particles smaller than 80 US Mesh | 14.5% |
| Mixture 7 | Percentage of particles smaller than 80 US Mesh | 17.4% |

TABLE 2

| Control 1 | Percentage of particles smaller than 80 US Mesh | 10.3% |
| Example 1 | Percentage of particles smaller than 80 US Mesh | 10.6% |
| Example 2 | Percentage of particles smaller than 80 US Mesh | 10.1% |
| Example 3 | Percentage of particles smaller than 80 US Mesh | 10.2% |

TABLE 3

| Control 1 | Percentage of particles smaller than 80 US Mesh | 10.1% |
| Example 1 | Percentage of particles smaller than 80 US Mesh | 12.12% |
| Example 2 | Percentage of particles smaller than 80 US Mesh | 14.2% |
| Example 3 | Percentage of particles smaller than 80 US Mesh | 18% |

Calculated Fine Particle Content of Table 1, 2, and 3 Formulations

Based on Total Mix Content of Particles Smaller Than 100 US Mesh

TABLE 1

| Control 1 | Percentage of particles smaller than 100 US Mesh | 1.74% |
| Control 2 | Percentage of particles smaller than 100 US Mesh | 3.13% |
| Mixture 3 | Percentage of particles smaller than 100 US Mesh | 4.32% |
| Mixture 4 | Percentage of particles smaller than 100 US Mesh | 4.86% |
| Mixture 5 | Percentage of particles smaller than 100 US Mesh | 7.78% |
| Mixture 6 | Percentage of particles smaller than 100 US Mesh | 6.75% |
| Mixture 7 | Percentage of particles smaller than 100 US Mesh | 8.10% |

TABLE 2

| Control 1 | Percentage of particles smaller than 100 US Mesh | 3.19% |
| Example 1 | Percentage of particles smaller than 100 US Mesh | 4.86% |
| Example 2 | Percentage of particles smaller than 100 US Mesh | 4.19% |
| Example 3 | Percentage of particles smaller than 100 US Mesh | 3.7% |

TABLE 3

| Control 1 | Percentage of particles smaller than 100 US Mesh | 3.13% |
| Example 1 | Percentage of particles smaller than 100 US Mesh | 7.78% |
| Example 2 | Percentage of particles smaller than 100 US Mesh | 11.43% |
| Example 3 | Percentage of particles smaller than 100 US Mesh | 18% |

Calculated Fine Particle Content of Table 1, 2, and 3 Formulations

Based on Total Mix Content of Particles Smaller Than 120 US Mesh

TABLE 1

| Control 1 | Percentage of particles smaller than 120 US Mesh | 0.17% |
| --- | --- | --- |
| Control 2 | Percentage of particles smaller than 120 US Mesh | 0.30% |
| Mixture 3 | Percentage of particles smaller than 120 US Mesh | 1.2% |
| Mixture 4 | Percentage of particles smaller than 120 US Mesh | 1.34% |
| Mixture 5 | Percentage of particles smaller than 120 US Mesh | 5.04% |
| Mixture 6 | Percentage of particles smaller than 120 US Mesh | 1.86% |
| Mixture 7 | Percentage of particles smaller than 120 US Mesh | 2.23% |

TABLE 2

| Control 1 | Percentage of particles smaller than 120 US Mesh | 0.31% |
| --- | --- | --- |
| Example 1 | Percentage of particles smaller than 120 US Mesh | 1.31% |
| Example 2 | Percentage of particles smaller than 120 US Mesh | 0.96% |
| Example 3 | Percentage of particles smaller than 120 US Mesh | 0.69% |

TABLE 3

| Control 1 | Percentage of particles smaller than 120 US Mesh | 0.3% |
| --- | --- | --- |
| Example 1 | Percentage of particles smaller than 120 US Mesh | 5.05% |
| Example 2 | Percentage of particles smaller than 120 US Mesh | 9.67% |
| Example 3 | Percentage of particles smaller than 120 US Mesh | 18% |

In view of the evaluatory and comparative tests conducted, as set forth above, it has been clearly demonstrated that the present invention enables the use of considerably more than 10% rice flour in food coating compositions for use on food substrates, particularly potatoes, with minimal or no observable reticulation after the food substrate coated with such compositions is frozen and held for an extended time, and provides improved color, crispness, holding time, and surface smoothness for the coated food after it is reconstituted, regardless of whether that is done by gradient heat, microwave energy, or deep-fat frying methods, all without impairing, and even improving, the visual appearance, flavor, and tooth compaction characteristics desirable to end consumers of the final cooked product. This is accomplished through use of an appreciable amount (preferably at least about 15% by weight of the total mix of coating ingredients) of rice flour and/or rice starch having a particle size rating in the range of about 100 USS Mesh size or finer, (i.e., particle size about 150 microns or less), i.e., significantly more of such small particle-size rice than found in the standard commercial "80 mesh size" category.

Somewhat more particularly, the above calculated values appear to indicate that with increasingly elevated amounts of rice in the coating mix, the results may be understood in terms of the total content of rice in the coating mixture and, in particular, the total quantity of various recognized small-particle sizes of the rice component. Where the total percentage of rice particles smaller than 80 USS Mesh size present is the criterion (and with reference to the "results" table appearing hereinafter), and good results with respect to crispness and such organoleptic qualities as tenderness/toughness is the goal, a content of about 5% of the criterion small particles does not yield good results but a content in the range of at least about 9% does begin to yield significantly improved results, particularly in view of the substantial lack of reticulation, crispness/toughness, etc. Interestingly, it appears that at considerably larger rice components of 25% to 30%, with small-particle (80 USS Mesh size or smaller) content in the 15 to 18% range, the favorable results begin to decrease. Where content of particles smaller in size than #100 USS Mesh is the criterion, the corresponding values indicate that, with rice contents greater than 10%, percentage values of the criterion less than about 3% did not yield good results, but percentages larger than about 4%, and up to about 7%, did. As before, with total content of rice in the 25% to 30% range, fine-particle contents ranging from 7% to 8% brought less improved results, although even as much as 18% (the highest range tested) did yield very good results (as compared, for example, to control #2 in Table 1, i.e., 18% commercial 80 USS Mesh size rating. Once again, using even finer (smaller than 120 USS Mesh size) particles as a criterion, contents of less than about ½% did not achieve the desired results, but between that range and as much as 18% did provide improved results (although the subjective results indicated are difficult to qualitatively appraise and prioritize in a specific sense). Nonetheless, the overall results are clear, and these various calculated criteria values do appear to provide a basis for enhancing understanding of the results to be obtained by using various implementations of the invention.

Similarly, it has also been discovered through the evaluatory and comparative tests conducted that the beneficial effects of the present invention can also be achieved through the use of a rice starch component, which typically has a particle size rating of about 200 USS mesh size or finer.

Although not wanting to be bound to any particular theory, it is believed that the benefits of the present invention are derived from controlling the particle size of the rice flour and/or rice starch components used in the coating composition to use the smaller sizes indicated above, such that when a sufficient concentration or total amount of these small (fine) rice particles are utilized in food coatings, reticulation is substantially minimized or prevented, while still obtaining the desired qualities of the most preferred food coatings in a cost-effective manner.

It is believed that by minimizing the particle size of rice flour and rice starch components according to the present invention, a substantial amount if not all of these components remain soluble within the coating composition rather than agglomerating upon freezing and forming opaque and unsightly reticulation bumps upon the coated frozen food substrate after reconstitution. By reducing the particle size of rice flour and rice starch according to the present invention, it is further believed that the amount of residual unground material, i.e. grit or "fines," is substantially reduced, leading to a more soluble final product, which when mixed within the slurry composition of the preferred embodiment does not agglomerate when ice crystals are formed during freezing.

As a result of this increased solubilization, its is believed that the small particle-size rice flour of about 100 mesh size rating or finer and rice starch of about 200 mesh or finer has the physical and chemical ability to remain soluble as melting ice crystals combine with the batter coating during final product reconstitution, and that if enough of this is used the composition will reduce or eliminate reticulation and also result in increased surface smoothness, crispness, and holding time, lighter color, greater coating uniformity, and improved tooth compaction, such as has not been possible by prior art practices.

Test Procedure:

200 grams of nominally 120 mesh size rating rice flour were placed on top of a 60 mesh size screen. Under the 60 mesh size screen were also placed an 80 mesh, a 100 mesh, and a 120 mesh size screen, followed by a collecting pan. These screens were ro-tapped for five minutes and the weight of the product remaining on top of each screen was recorded to assess the amount of rice flour particles which did not pass through that screen. The product passing through the 120 mesh size screen was collected in the collection pan and weighed, and then placed on top of a 150 mesh size screen. Under the 150 mesh size screen were also placed a 170 mesh, then a 200 mesh, and then a 270 mesh size screen, followed by a collecting pan. These screens were then ro-tapped for five minutes, and the weight of the product remaining on the top of each screen was then recorded as well. The weight of product passing through the 270 mesh screen was also collected in the collection pan and weighed. All weights were then converted to percentages to assess the amount of fines not passing through the 150–270 mesh phase of the experiment. The same procedure was then utilized with an 80-mesh size rating rice flour product.

Results

| Flour | 120 Mesh Size Rating Rice Flour | 80 Mesh Size Rating Rice Flour |
| --- | --- | --- |
| % Above 60 Mesh Size Screen | 0.53 | 0.11 |
| % Above 80 Mesh Size Screen | 39.55 | 43.88 |
| % Above 100 Mesh Size Screen | 23.40 | 38.61 |
| % Above 120 Mesh Size Screen | 23.37 | 15.72 |
| Pan Weight (Through a 120 Mesh Size Screen) | 27.17 GM | 3.57 GM |
| Pan weight from above then placed into second set of screens to ro-tap: | | |
| % Above 150 Mesh Size Screen | 0.59 | 0.03 |
| % Above 170 Mesh Size Screen | 5.66 | 0.18 |
| % Above 200 Mesh Size Screen | 3.79 | 0.74 |
| % Above 270 Mesh Size Screen | 2.63 | 0.66 |
| % Pan (Through a 270 Mesh Size Screen) | 0.47 | 0.08 |
| TOTAL: | 99.99% | 100.01% |

As can be seen from the above, the commercial "80-mesh size rating" rice flour product actually has a sizable number of particles that are larger than a #80 USS mesh size screen, and another large component of particles that is slightly smaller than those but still larger than a #100 USS mesh size screen, thought to be around 80–90 mesh, while the "#120 USS mesh size rating" rice flour, while including a significant amount of particles larger than the openings in a #80 USS mesh size screen, and a sizable component smaller than those but larger than the openings in a #100 USS mesh size screen, also has a very sizable component that is smaller than the openings in a #100 USS mesh size screen, including a substantial amount that would be classified as 120 mesh size, plus another significant amount that is even smaller than that. Thus, as the size number of the mesh increases, the particle size decreases. The amount of particles collected on a given screen represents the amount of particles larger than the openings in that screen, which would not fit through that mesh screen. Conventional prior art rice flours used in food coatings were nominally "80 mesh size rating," with particles thought to primarily be in a mesh size range of 70–mesh, while the fine-particle rice component of the preferred embodiment is smaller than that, i.e., having particles with a mesh size from about #100 USS mesh size or finer.

It has also been surprisingly discovered that through use of rice flour having a particle size rating of #100 USS mesh or finer, or rice starch having a particle size rating of #200 USS mesh or finer, concentrations of rice flour and/or rice starch significantly greater than 10% may be utilized in coating compositions, with minimal or no production of reticulation upon coated food substrates after final product reconstitution, even when frozen very quickly and at very low temperatures. Furthermore, by increasing the percentage of these smaller particle-sized components, particular rice flour, within coating compositions, the cost of such compositions is greatly reduced.

In addition, it has been discovered that the smaller particle-sized rice flour or rice starch components can be used separately or in combination with each other as well as with other known coating components without loss of the desired qualities and characteristics in the food product. For example, the rice flour or rice starch components of the preferred embodiment can be used in combination with such conventional food coating ingredients as potato starch, corn starch, dextrin, maltodextrin, cellulose, ether rice flour having a particle size larger than #100 USS mesh, rice starch having a particle size larger (coarser) than about 200 mesh, and the like, e.g., on a proportional percentage weight basis.

For example, a coating composition could contain 15% rice flour having a particle size rating of 100 mesh or finer, 15% rice starch having a particle size rating of #200 USS mesh or finer, 15% rice flour having a particle size rating of #100 USS mesh or larger (coarser), 15% of a rice starch having a particle size rating of #200 USS mesh or larger, 15% dextrin, 15% potato starch, and 10% corn starch, which would achieve the desired objectives of the present invention. Further, the rice flour and/or rice starch components of the preferred embodiment can be utilized within prior art coating compositions to aid those compositions in overcoming their reticulation difficulties. For example, a prior art coating containing 12% rice flour having a particle size rating of nominally 80 mesh, could be replaced with rice flour having a particle mesh size rating of from about 100 mesh or finer in accordance with the present invention, to substantially improve that prior art coating composition by overcoming objectionable reticulation (and also increase its favorable qualities). Thus, the rice flour and rice starch components of the preferred embodiment can be used alone, in combination with each other, in combination with known prior art additives, or as replacements for known prior art components, while still achieving the desired objectives of the present invention.

The rice flour component of the preferred embodiment is a finely ground flour milled from medium or long grain rice. Its starch component is over 75% amylopectin. Rice flour of from about 100 mesh size rating or finer does not break down with high temperatures and shear, and has excellent freeze-thawability. It is generally white in color and has a very neutral or bland flavor.

Since rice flour is made from the actual rice grain itself, it comprises a number of components including protein, crude fat, crude fiber, crude ash, nutrodetergent fiber, pentosans, presugars, lignin, and a great deal of starch (normally more than 50%). Starch powder, as referred to above herein as a component or alternative component, is refined from rice flour and has only the most minimal amounts of other components (e.g., ash content, protein, fat, etc.) and is virtually entirely composed of starch. It is, nonetheless, a rice constituent or product, and has a white color and neutral taste. As indicated above, rice starch powder in accordance with the invention has a particle size rating of 200 mesh or finer.

As stated above, prior art coating compositions have only utilized the conventional larger particle-sized 80 mesh size rating rice flour component. This product typically will have a near complete (90–95%) passage through a 50 size sieve, but about 45% of it is actually larger than 80 mesh size screen, and another 39% is larger than a 100 mesh screen. A rice flour component having a mesh size rating according to the present invention will have a particle size that is on average smaller than that of the conventionally-used 80 mesh size rating rice. It is this discovery, that by reducing the particle size of at least a significant part of the rice flour used in the coating to one having a size of 100 mesh size or finer, or rice starch having a mesh size of 200 mesh or finer, one can substantially reduce or even eliminate the objectionable reticulation typically produced by conventional rice-containing food coating compositions used on food product substrates, frozen very quickly and at very low temperatures, such as dehydrofreezing, and subsequently reconstituted.

Generally speaking, it is the appreciation of the physical properties of rice flour and rice starch particles with relation to agglomeration when frozen, as water crystals develop during freezing in the batter applied to the food substrates, that allows one to appreciate the underlying concept of the invention, by which the stated objectives and advantages are obtained when the larger rice particles of the prior art (nominally 80 mesh size rating) are used in any substantial amount (e.g., about 10% or more), in which reticulation occurs within 24–72 hours, causing an unsuitable product. Thus, if one of ordinary skill in the art wishes to obtain the advantages of coating compositions containing finer than 10% rice, a rice particle mesh size rating of from about 100 or finer should be used, although using a mesh size of slightly less than 100, to about 95, may also perform acceptably, achieving at least some of the advantages of the invention. In this regard, it should be noted that there is no standard "#100 mesh size rating" rice flour that is readily available commercially, only "80 mesh size rating" and "120 mesh size rating." Consequently, selected portions of these two available size ratings must be used to obtain the desired amount of particles that are at least as small as about 100 USS mesh size (presently thought to preferably be at least about 15% of the total rice component used).

Unlike prior art coating compositions, the preferred embodiment's use of rice flour having a nominal particle size of 100 mesh or finer, or alternatively rice starch having a nominal particle size of 200 mesh or finer, reduces or prevents reticulation from developing when the coating composition is placed upon a food substrate and the coated substrate subsequently frozen and reconstituted, and it also improves the crispness, holding time, surface smoothness, color, and uniform of coating of the final product after reconstitution, whether by deep fat frying, microwave energy, or gradient heat oven reconstitution methods, without sacrificing visual appearance, flavor, and tooth compaction characteristics desirable to consumers of the final cooked product.

The benefits of the present invention may be obtained by using the coating on vegetables, such as mushrooms, broccoli and cauliflower, or on meats, such as fish, chicken and the like. Other suitable applications for the coating composition of the invention will be appreciated by those skilled in the art. Since the coating compositions of the invention provide improved crispness and increased holding time of the final cooked product, such products can now for the final time be utilized in "take home" or "delivery" applications, which were previously impractical even though desirable. Finally, through utilization of the increased levels of rice flour or rice starch components in accordance with the invention, the overall cost of producing a coating composition having the desirable enhancements noted above is substantially reduced compared to the prior art.

The above description is considered that of the preferred embodiments only. Modifications of these embodiments in accordance with the invention will occur to those skilled in the art and to those who make or use the invention. Therefore, it is to be understood that the embodiments described above are merely for illustrative purposes and not intended to limit the scope of the invention, which is generally set forth in the appended Statements of Invention, and/or corresponding claims, as interpreted according to the principles of patent law, including the doctrine of equivalents.

The invention claimed is:

1. A substantially reticulation free food substrate coating composition comprising:
a water-dispersible mix of particulate ingredients comprising a rice component comprising more than about 10% of the mix, wherein the rice component comprises more than about 36.51% by weight of about 100 US mesh size or smaller rice particles.

2. The coating composition of claim 1, wherein the rice component comprises rice flour.

3. The coating composition of claim 2, wherein the rice component comprises a mix of different commercial rice particle size rated rice ingredients and at least one of the rice ingredients is an about 120 US mesh size or smaller commercial size rated rice ingredient.

4. The coating composition of claim 1, wherein the rice component comprises rice starch.

5. The coating composition of claim 4, wherein the rice component of the coating composition further comprises a rice flour.

6. The coating composition of claim 1, wherein the rice component comprises a mix of different commercial size rated rice ingredients wherein at least one of the rice ingredients is an about US 120 mesh size or smaller commercial size rated rice ingredient.

7. The coating composition of claim 1, wherein the rice component comprises up to about 18% of the mix.

8. The coating composition of claim 1, wherein the mix of particulate ingredients further comprises dextrin.

9. The coating composition of claim 8, wherein the mix of particulate ingredients further comprises a potato starch.

10. The coating composition of claim 9, wherein the mix of particulate ingredients further comprises a corn starch.

11. A substantially reticulation free coating composition for food products comprising:
a water-dispersible mix of particulate ingredients composing a rice component comprising more than about 10% by weight of all of the soluble components of the mix of particulate ingredients taken together wherein the rice component comprises more than about 13.14% by weight rice particles which are about 120 US mesh size or smaller rice particles.

12. The coating composition of claim 11, wherein the rice component comprises a rice flour.

13. The coating composition of claim 11, wherein the rice component comprises a rice starch.

14. The coating composition of claim 11, wherein the rice component comprises at least about 15% by weight of all of the soluble components of the mix of particulates taken together.

15. The coating composition of claim 14, wherein the rice component comprises up to about 90% by weight of all of the soluble components in the mix of particulates taken together.

16. The coating composition of claim 11, wherein the rice component comprises up to about 18% by weight of all the soluble components of the mix of particulate ingredients taken together.

17. The coating composition of claim 11, wherein the mix of particulate ingredients further comprises dextrin.

18. The coating composition of claim 11, wherein the mix of particulate ingredients further comprises a potato starch.

19. The coating composition of claim 11, wherein the mix of particulate ingredients further comprises a corn starch.

20. A method of substantially eliminating reticulation in the use of food coating compositions comprising the steps of:
at least partially coating a food substrate with a coating composition comprising soluble components comprising a rice component that comprises more than about 36.51% by weight of about 100 US mesh size or smaller rice particles;
at least partially thermally processing the food substrate; and
freezing the at least partially thermally processed food substrate wherein the coating composition is substantially free of reticulation after at least partially thermally processing and freezing the food substrate.

21. The method of claim 20, wherein the rice component comprises at least about 9% by weight of the overall amount of soluble components in the composition.

22. The method of claim 20, wherein the rice component comprises rice flour.

23. The method of claim 22, wherein the coating composition further comprises rice flour having a commercial size rating of #US 120 Mesh size or smaller commercial size rating.

24. A method of substantially eliminating reticulation in the use of food coating compositions comprising the steps of:
at least partially coating a food substrate with a coating composition comprising a first rice component comprising at least about 52% more particles smaller in particle size than 100 US mesh than the amount of particles having a particle size smaller than 100 US mesh found in commercially rated 80 US mesh rice flour;
at least partially thermally processing the food substrate; and
freezing the at least partially thermally processed food substrate wherein the coating composition is substantially free of reticulation after at least partially thermally processing and freezing the food substrate.

25. The method of claim 24, wherein the coating composition comprises a mix of the first rice component and at least one other rice component and wherein the first rice component comprises at least about 5% by weight of the mix.

26. The coating composition of claim 24, wherein the coating composition further comprises dextrin.

27. The coating composition of claim 24, wherein the coating composition further comprises a potato starch.

28. The coating composition of claim 24, wherein the coating composition further comprises a corn starch.

29. A substantially reticulation free potato substrate coating composition for food products comprising:
a water-dispersible mix of particulate ingredients comprising a rice component comprising more than 10% of the mix, wherein the rice component comprises at least about 52% more particles smaller in particle size than 100 US mesh than the amount of particles smaller than 100 US mesh found in commercially rated 80 mesh rice flour.

30. The method of claim 29, wherein the rice component comprises at least about 36.51 % by weight rice particles which are smaller than 100 US mesh size.

31. The coating composition of claim 29, wherein the mix of particulate ingredients further comprises dextrin.

32. The coating composition of claim 29, wherein the mix of particulate ingredients further comprises potato starch.

33. The coating composition of claim 29, wherein the mix of particulate ingredients further comprises a corn starch.

34. A substantially reticulation free potato substrate coating composition for food products comprising:
a water-dispersible mix of particulate ingredients comprising a rice component comprising more than 10% by weight of the mix, wherein the rice component comprises mare than about 0.5% by weight of a first rice ingredient comprising a commercial size rating of 120 US mesh size or smaller commercial size rating.

35. The coating composition of claim 34, wherein the first rice ingredient comprises at least about 1 % of the mix of particulate ingredients.

36. A substantially reticulation free potato substrate coating composition for food products comprising:
a water-dispersible mix of particulate ingredients comprising a rice component constituting more than 10% by weight of the mix, wherein the rice component comprises at least some rice starch having particles which are on the order of about 200 US mesh size and the coating composition is substantially free of reticulation after at least partially thermally processing and freezing a food substrate at least partially coated with the coating composition.

37. A substantially reticulation free coated food product comprising:
a potato substrate at least partially coated with a coating composition comprising a water-dispersible mix of particulate ingredients comprising a rice component comprising more than about 10% of the mix wherein the rice component comprises more than about 59.91% by weight of rice particles which are smaller than 80 US mesh size.

38. The coated food product of claim 37, wherein the rice component comprises up to about 18% of the mix.

39. The coated food product of claim 37, wherein the rice component has a commercial size rating of about 120 US mesh size or smaller commercial size rating and the coated potato substrate is thermally processed.

40. A substantially reticulation free coated food product comprising:
a food substrate selected from the group consisting of a vegetable and a meat and a coating composition at least partially coating the food substrate comprising:

a water-dispersible mix of particulate ingredients composing a rice starch comprising more than about 10% of the mix and wherein the rice starch comprises particles that about 200 US mesh size or smaller.

41. A substantially reticulation free coated and thermally processed food product comprising:

a food substrate selected from the group consisting of a vegetable and a meat and a coating composition at least partially coating the food substrate comprising a water-dispersible mix of particulate ingredients comprising a rice component comprising more than about 10% of the mix and wherein the rice component comprises more than about 59.91% by weight of rice particles which are smaller than 80 US mesh size.

42. The coated food product of claim 41, wherein the vegetable comprises a potato substrate.

43. The coated food product of claim 42, wherein the coating composition further comprises a dextrin.

44. The coated food product of claim 41, wherein the rice component comprises a rice flour.

45. The coated food product of claim 41, wherein the rice component comprises a rice starch.

46. The coated food product of claim 41, wherein the rice component comprises a rice starch and a rice flour.

47. A method of making a substantially reticulation free coated food substrate comprising the steps of:

providing a coating composition for food products, wherein the coating composition comprises a water-dispersible mix of particulate ingredients including a rice component constituting more than about 10% of the mix and wherein the rice component contains more than about 59.91% by weight of rice particles which are smaller than 80 US mesh size;

coating the food substrate with the coating composition;

thermally processing the coated food product;

freezing the coated food product, wherein after freezing the coated food product the coated food product is substantially free of reticulation; and reconstituting the food product.

48. A substantially reticulation free coating composition for meat or vegetable food products comprising:

a water-dispersible mix of particulate ingredients comprising a rice component comprising at least about 52% more particles smaller in particle size than 100 US mesh than the amount of particles having a particle size smaller than 100 US mesh found in commercially rated 80 US mesh rice flour and;

wherein the rice component comprises up to about 18% by weight of all of the soluble components of the mix of particulate ingredients taken together.

49. A coating composition for food products which permits use of a large rice component with little or no objectionable reticulation, comprising in combination:

a water-dispersible mix of particulate ingredients including a rice starch component constituting more than 10% of the mix, said rice starch component containing more than about 56% by weight of rice particles which are smaller than 80 US mesh size.

50. A coating composition for food products which permits use of a large rice component with little or no objectionable reticulation, comprising in combination:

a water-dispersible mix of particulate ingredients including a rice starch component constituting more than 10% of the mix, said rice starch component containing more than about 56% by weight rice particles, wherein the rice starch component comprises a mix of different standard commercial rice particle size graded and at least one paid grade has more particles smaller in US mesh size than the commercial size rating know as "US 80 Mesh size."

51. A substantially reticulation free, coated and thermally processed vegetable or meat coated product comprising a vegetable or meat substrate coated with a coating composition comprising a mix of ingredients comprising at least about 10% rice component comprising an about 100 US mesh size commercial size rating or smaller commercial size rating.

52. The coating composition of claim 51, wherein the mix of ingredients further comprises dextrin.

53. A method of making a substantially reticulation free coated meat or vegetable substrate comprising the steps of:

providing a vegetable or meat substrate, and a coating composition comprising a mix of ingredients comprising at least about 10% rice component comprising an about 100 US mesh size commercial size rating or smaller commercial size rating;

coating the meat or vegetable substrate with the coating composition;

thermally processing the coated substrate; and freezing the coated food product, wherein after freezing the coated food product the coated food product is substantially free of reticulation.

* * * * *

UNITED STATES PATENT AND TRADEMARK OFFICE
CERTIFICATE OF CORRECTION

PATENT NO. : 6,899,906 B2 Page 1 of 1
APPLICATION NO. : 09/960191
DATED : May 31, 2005
INVENTOR(S) : John F. Stevens et al.

It is certified that error appears in the above-identified patent and that said Letters Patent is hereby corrected as shown below:

Col. 3, line 47;
After "inch (first occurrence)" insert -- by ¼ --;

Col. 12, line 7;
"70-mesh" should be -- 70-90 mesh --;

Col. 12, line 20;
"particular" should be -- particulate --;

Col. 14, claim 11, lines 61-62;
"composing" should be -- comprising --;

Col. 16, claim 29, line 14;
After "80" insert -- US --;

Col. 17, claim 40, lines 1-2;
"composing" should be -- comprising --;

Col. 17, claim 40, line 4;
Before "about" insert -- are --;

Col. 18, claim 50, line 22;
"paid" should be -- said --;

Signed and Sealed this

Seventh Day of October, 2008

JON W. DUDAS
*Director of the United States Patent and Trademark Office*